Feb. 14, 1956 D. J. GREEN ET AL 2,734,944
DIFFERENTIAL AMPLIFIER METHOD OF CANCELLING RIPPLE PICK-UP
Filed May 7, 1951 2 Sheets-Sheet 1
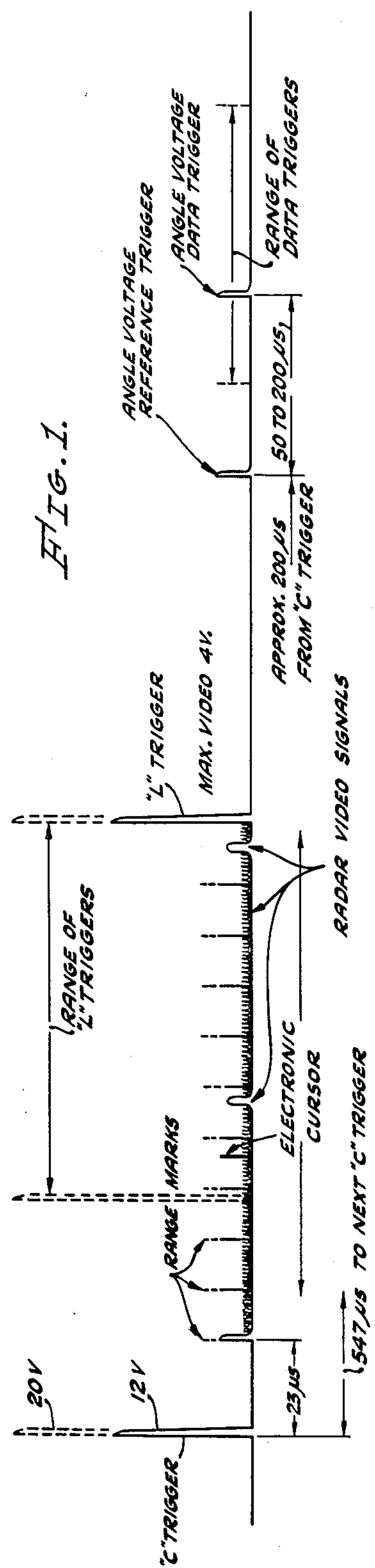
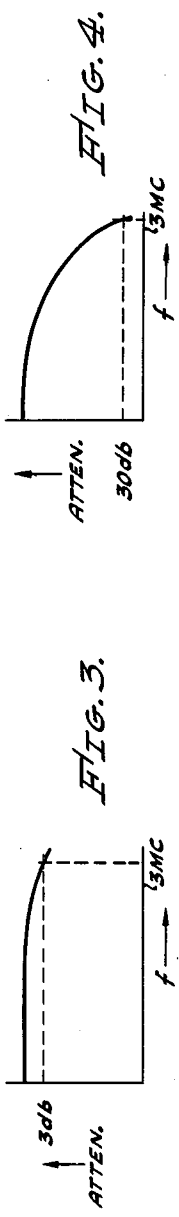
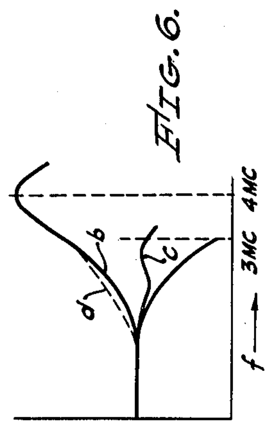
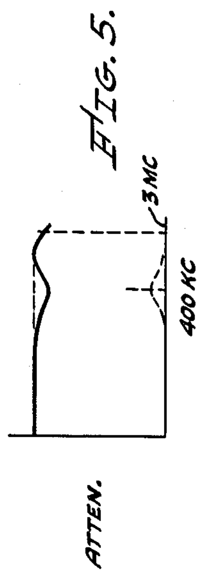
DAVID J. GREEN,
THOMAS J. JOHNSON, JR.,
ROBERT W. LANDEE,
INVENTORS.
BY Lyon & Lyon
ATTORNEYS.

Feb. 14, 1956 D. J. GREEN ET AL 2,734,944
DIFFERENTIAL AMPLIFIER METHOD OF CANCELLING RIPPLE PICK-UP
Filed May 7, 1951 2 Sheets-Sheet 2
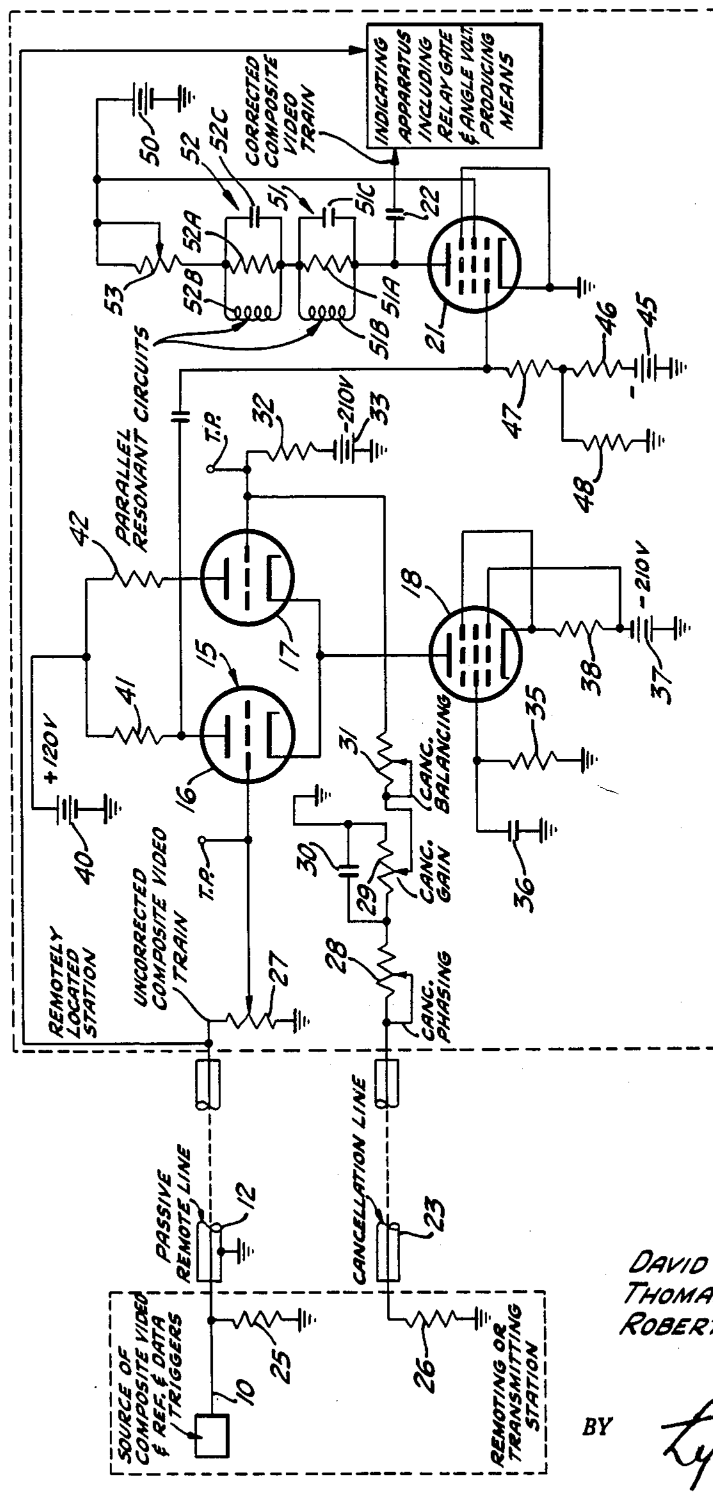
DAVID J. GREEN,
THOMAS J. JOHNSON, JR.,
ROBERT W. LANDEE,
INVENTORS.
BY Lyon & Lyon
ATTORNEYS.

United States Patent Office 2,734,944
Patented Feb. 14, 1956

1

2,734,944

DIFFERENTIAL AMPLIFIER METHOD OF CANCELLING RIPPLE PICK-UP

David J. Green, Pacific Palisades, Robert W. Landee, Santa Monica, and Thomas J. Johnson, Jr., Los Angeles, Calif., assignors to Gilfillan Bros. Inc., Los Angeles, Calif., a corporation of California Application May 7, 1951, Serial No. 224,972

8 Claims. (Cl. 178—69)

The present invention relates to improved means and techniques whereby composite video signals may be transferred to remotely located stations without substantial interference due to electrostatic or electromagnetic influences exerted by neighboring lines carrying currents of low frequency of, for example, 60 cycles; and specifically, without limiting the use of the present invention, the present invention relates to improved means and techniques whereby the video and related triggers and pulses in a radar system may be transmitted to a remote location over the same transmission line while preserving the fidelity of the composite video.

The present invention contemplates an improvement in ground controlled approach (G. C. A.) radar systems in which the echo receiving antenna may, for example, be located adjacent an aircraft landing strip with an associated indicator located at a remote position, as for example, in a control tower which may be located as much as two miles from the site of the antenna.

In such systems a part of the echo receiving system is located adjacent the antenna in which the received echoes are detected, and the resulting video is transferred over a transmission line, such as a coaxial cable, to the control tower at which the video is applied to a cathode ray tube to produce visual indications of the video.

Such video is comprised of different frequency components extending, for example, from below 60 cycles per second to 3 megacycles, and it is desirable that the video be conveyed without appreciable loss in fidelity from the antenna to the remotely located cathode ray tube indicator. One of the chief factors contributing to loss in fidelity in systems of this character results from interferring voltages induced into the connecting lines from neighboring power lines. These voltages, induced electromagnetically or electrostatically, are of course of power frequency and have caused considerable trouble in the past, particularly since these pickup voltages may not remain constant either in amplitude or in "phase."

Heretofore, different attempts have been made to overcome the deleterious effects produced by such interfering voltages such as, for example, using a shielded twisted cable pair and a low pass filtering networks. Such networks leave much to be desired, since they require elaborate design, are bulky, and themselves introduce undesirable time delay and require adjustment, depending upon the intensity of the voltage induced and its phase. This problem is made more difficult in those instances where the level of these interference voltages exceeds that of the transmitted video signal.

Furthermore, difficulties are encountered in systems of this character because, as observed, the actual ground potential at points spaced in the order of two miles may differ as much as 5-volts. This difference in voltage likewise may vary in magnitude and in phase, depending upon the loading of neighboring power lines and other electrical facilities, and introduce certain deleterious effects unless precautions are taken against the same.

It is therefore an object of the present invention to

2 provide improved means and techniques whereby the effect of the interfering voltages of power frequency is minimized, whereby the video may be transferred to a remotely located station without appreciable loss in fidelity.

Specifically, an object of the present invention is to provide means and a teaching whereby the effect of interfering signals of power frequency induced in a long transmission line carrying composite video frequencies may be minimized or eliminated.

Another specific object of the present invention is to provide an improved remoting system whereby a composite video signal which includes echo signals, triggers and pulses may be transferred over the same transmission line extending to a remotely located indicating station without deleterious effects produced by induction of voltages of power frequency from neighboring power lines and by differences in ground potential between the remoting station and the remotely located station.

Another specific object of the present invention is to provide improved means incorporating an auxiliary cable subjected to the same interference as the transmission line cable and related apparatus, whereby such interference may be cancelled out so as to produce no appreciable effect on the composite video.

Another specific object of the present invention is to provide an improved remoting system of the character indicated in the preceding paragraph, in which a differential amplifier serves to produce cancellation of video but yet serves as a passive network for the composite video free from such interference.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a schematic representation of remoting apparatus for achieving certain advantages of the present invention;

Figure 2 is a graphical representation of the composite video train which is transferred by the apparatus shown in Figure 1 from a remoting location to a remotely located location without appreciable interference resulting from electrostatic and/or electromagnetic pickup or from differences in ground potential between the two stations;

Figures 3, 4, 5 and 6 are useful in illustrating the action of the equalizer stage 20 in restoring the high frequency components of the video train which are lost in transmission over the remoting line or cable 12. All of these curves illustrate the manner in which the different frequency components of the video train are attenuated in proportion. Figure 3 serves to illustrate the result obtained. Figure 4 serves to illustrate the characteristic of the remoting line or cable 12. Figure 5 serves to illustrate the relative contributions made by the two parallel tuned circuits in the equalizer stage, and Figure 6 serves to illustrate the necessity for using two parallel tuned circuits in the equalizer stage for obtaining good fidelity.

Briefly, without limiting the scope of the present invention, it is described specifically herein for accomplishing the purpose of transmitting a composite video train, of the character shown in Figure 3, from the input terminal 10 at the remoting station 11 over a transmission line 12 to a remotely located station 13, for producing indications on a cathode ray tube incorporated in the indicating apparatus shown in block form at 14.

The components of the composite video train shown in Figure 2 are clearly indicated therein, and such composite video train is produced using the arrangement described and claimed in the copending patent application of Landee et al., Serial No. 247,616, filed September, 21, 1951 and assigned to the same assignee as the present application.

Briefly, such composite video train includes the echo signals of the radar system, range marks in the form of pulses, modulated in amplitude, however, for purposes of conveying so-called V-follower information, both C and L triggers useful in the formation of the display on the cathode ray tube, such C and L triggers, however, being both modulated in amplitude for conveying information to the remotely located station as to whether the azimuth antenna or the elevation antenna is at that particular time scanning through space. The composite video train also includes a so-called reference trigger and a related data trigger, the variable spacing between which is used to convey information as to the particular angular position of the radiated antenna beam from either the azimuth antenna or the elevation antenna, as the case may be.

The indicating apparatus shown in block diagram at 14 forms, per se, no part of the present invention, but of course is receptive to the composite video train, and may for that purpose comprise the equipment shown and described specifically in the aforementioned copending patent application, Serial No. 247,161.

The composite video applied to the terminal 10 and central conductor of the coaxial cable 12, having its sheath grounded, is after reception at the remotely located station 13 subjected to the action of the differential amplifier 15, which includes the tubes 16, 17 and 18. The output of the differential amplifier 15 appearing at the anode of tube 16 is subjected to an equalizing network 20, which includes the tube 21. The output of such equalizing network 20 appearing at the anode of tube 21 is coupled to the indicating apparatus 14 through coupling condenser 22.

In accordance with certain important aspects of the present invention, an auxiliary transmission line 23, termed the cancellation line, is used for the purpose of cancelling bothersome interfering pickup voltages which may be induced in the transmission line 12. For this purpose, the cancellation line 23 is of identical structure as the transmission line 12, and extends parallel therewith in closely spaced relationship, so that such line 23 is subjected to the same interference as the transmission line 12. Also, the terminating impedances at corresponding ends of the lines 12 and 23 are substantially the same, although, as will be described hereinafter, the terminating impedance of the line 23 at the remotely located station 13 is made adjustable for accomplishing cancellation. At the remoting or transmitting station 11, the terminating impedances for the lines 12 and 23 are fixed in magnitude and comprise resistances 25 and 26, respectively.

At the remotely located station 13, the terminating impedance for the line 12 includes the potentiometer type resistance 27, which has its adjustable tap connected to the control grid of tube 16. The resistance 27 thus serves as a voltage dividing element whereby the level of the signal applied to the control grid of tube 16 may be adjusted. Such signal includes the composite video train as well as interfering voltages induced in the line 12.

The line 23 terminates at station 13 in an impedance represented by the two serially connected elements, namely, (1) the adjustable cancellation phasing resistance 28; (2) the adjustable cancellation gain resistance 29 shunted by the condenser 30. The tap on resistance 29 is connected to one terminal of adjustable cancellation balancing resistance 31. The other terminal of resistance 31 is connected to the control grid of tube 17. The fixed resistance 32 has one of its terminals connected to the control grid of tube 17 and the other one of its terminals connected to the ungrounded terminal of voltage source 33, which may be considered for present purposes to have zero resistance.

Thus, the outputs from the lines 12 and 23 are applied to the control grids of tubes 16 and 17, respectively. Tubes 16 and 17 have their cathodes connected jointly to the anode of tube 18, of the pentode type. The screen grid of tube 18 is returned to ground through resistance 35 shunted by condenser 36. The control grid of tube 18 is connected to the negative ungrounded terminal of voltage source 37 and the cathode of tube 18 likewise is connected to such ungrounded terminal through resistance 38.

It is observed that pentode tube 18 is thus connected and serves as a constant current device for the flow of space current which flows jointly through tubes 16 and 17. To complete a path for the flow of such space current, the positive ungrounded terminal of voltage source 40 is connected to the anode of tubes 16 and 17 through corresponding plate resistances 41, 42.

As will be described in detail hereinafter, the circuitry thus far described serves as a differential amplifier effective to substantially reduce or entirely eliminate the effects otherwise produced by induction of interfering voltages into the transmission line 12, and from deleterious effects produced by differences in ground potential between stations 11 and 13.

The cancelled output of this differential amplifier 15 is applied from the anode of tube 16 through coupling condenser 43 to the control grid of pentode tube 21, such control grid being maintained at a negative potential with respect to its grounded cathode by the voltage source 45 having its negative ungrounded terminal connected to such control grid through serially connected resistances 46 and 47. The junction point of resistances 46 and 47 is returned to ground through resistance 48. The tube 21 forms a component part of the equalizer network 20, and while the specific form of equalizer network shown herein is preferred, it is understood that certain aspects of the present invention may be practiced using other different types of equalizing networks.

The specific network 20 shown herein serves to produce a compensatory effect for the loss suffered by the high frequency components of the video in its transmission through the cable or transmission line 12, which may have a length of two miles. To produce such compensatory effect, the anode of tube 21 is serially connected to the positive terminal of voltage source 50 through equalizing circuits 51, 52 and variable resistance 53. The equalizing circuit 51 includes shunt connected resistance 51A, inductance 51B and condenser 51C. Similarly, the equalizing circuit 52 includes shunt connected resistance 52A, inductance 52B and condenser 52C. The screen grid of tube 21 is connected directly to the positive terminal of source 50. The output of the equalizer network 20 appearing at the anode of tube 21 is coupled to the indicating apparatus 14 through coupling condenser 22.

Since the components of the composite video train are non-uniformly attenuated frequencywise by the remoting cable or line 12, the equalizing network 20 serves to reshape the video signals, and this in general is accomplished by the network 20 which has approximately inverse frequency characteristics of the line.

The negative-going video signals from the end of the remoting line 12 are applied to the control grid of tube 16 through gain control resistance 27. Due to the extremely high signal impedance presented to the cathode of tubes 16 and 17 by tube 18, any change in current in tube 16, due to signals aplied on its grid, are duplicated by changes in current in the opposite direction by tube 17. In other words, signal voltage applied to the grid of tube 16 causes a direct transfer of current from tube 16 to tube 17. If, on the other hand, similar voltages are applied to the grids of tubes 16 and 17 simultaneously, no change in plate current in either tube will result. The input to the grid of tube 17 is from the end of a dummy cancellation line 23, which is run parallel to the remoting line 12 so that any pickup and difference in ground potential may be duplicated at both grids of the differential amplifier 16, 17. Only the difference signals between the output of the remoting line 12 and the dummy line 23, which is the composite video train shown in Figure 2, result in current change in the differential amplifier tube. Noise and pickup having been cancelled, the video signals are taken from the plate of tube 16 as positive-going signals.

Using normal amplitude composite video into the line driver coupled to terminal 10 and viewing the output video at the anode of tube 21 with a synchroscope, the following adjustments are made. Reduce video input to zero amplitude by grounding the tap on resistance 27, and set cancellation balance resistance 31, so that a differential reading between the movable tap and the grid of tube 17 shows zero D. C. voltage. Set the video gain resistance tap so that the proper level video appears. Now set the cancellation gain resistance 29 and cancellation phasing resistance 28 so that the ripple voltage (which is caused by inductive pickup on the lines 12, 23) is a minimum. These steps should be repeated two or three times due to interaction between the controls.

Tube 21 is used as in an equalizer stage. This stage uses as its plate load a combination of resistances, inductances, and capacitances in a circuit which gives an approximate inverse characteristic of the remoting line for pulse response, as mentioned previously.

Using this network 20, the overall bandwidth of the remoting equipment appears as shown in Figure 3, the equalizer 20 thus compensating for the cable characteristics shown in Figure 4, up to approximately 3 megacycles per second.

In Figure 1, the parallel circuit 51 comprising inductance 51B, condenser 51C and resistance 51A, is tuned to approximately 4 megacycles and without the parallel tuned circuit 52, the resultant overall response appears as shown in Figure 5, and it is noted that such response curve has a dip in it at aproximately 400 kilocycles. For this reason the additional tuned circuit 51 is used to raise this "dip" in the response curve, such circuit 51 being tuned to 400 kilocycles.

It should be pointed out that in attempting to correctly equalize with one parallel resonant circuit instead of two circuits, the following difficulties are encountered. Referring to Figure 6, the one circuit having been tuned to 4 mc. p. s., would produce curve *b* by itself alone and the overall system response would contain the dip (curve *c*). To produce a flat response, the slope of curve *b* should be changed to that shown as *d*, which is the inverse characteristic of the remoting cable. This could be approximately accomplished by decreasing the Q or by decreasing the resonant frequency of the circuit. If the resonant frequency were decreased, the overall bandwidth would be decreased, thus resulting in a poor fidelity system. If the Q were decreased, the impedance of the circuit ($Z=QW_rL$) would be decreased, thus necessitating an increase in either L or $W_r$ to achieve the same impedance as before. (If the impedance were decreased, the overall bandwidth would also be decreased.) However, due to the fact that the total capacity across the tank circuit is approximately 30 $\mu\mu$f., and that the resonance point is already at about 4 mc. p. s., the inductance has already reached its largest value of 50 $\mu$h. In other words, at the time the dip occurred, all circuit parameters were at their optimum values in regard to bandwidth, and it can be seen that at 10,000 feet of cable, and with one resonance circuit, it is possible to attain either 3 mc. p. s. overall response with a dip present or considerably less than 3 mc. p. s. with a flat response. By tuning every remoting line equalizer to produce a dip in the response curve, optimum bandwidth is achieved. With the addition of another resonant circuit, as part of the equalizer, tuned to the frequency at which the dip occurs, an essentially flat response with optimum bandwidth is attained.

The variable resistance 53 is set to produce the best quality of video at the output of this unit. The action of this resistance is to set the ratio of low frequency gain to high frequency gain, and thus to serve as a fine adjustment for shaping the overall responsive curve. Thus, there is available at the anode of the equalizer tube 21 the composite video train shown is Figure 2 with the high frequencies originally lost in transmssion restored by the equalizer stage 20.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described wherein it is desired to transmit video signals to a remotely located position over a passive transmission line subject to interference from neighboring sources of low frequency power lines, a differential amplifier coupled to said passive transmission line, an auxiliary transmission line extending generally parallel with said passive transmission line and subject to the same interference as said passive transmission line, and means coupling said auxiliary transmission line to said differential amplifier, said differential amplifier comprising: a first amplifying tube having a control electrode thereof coupled to said passive transmission line, a second amplifying tube having a control electrode thereof coupled to said auxiliary transmission line, said first and second amplifying tubes being connected in parallel to form a parallel circuit, and a constant current device serially connected with said parallel circuit.

2. In a system of the character described, a passive transmission line subject to interference from neighboring sources of low frequency power lines, an auxiliary transmission line substantially the same as said passive transmission line and extending generally parallel therewith throughout its entire length so that both said passive transmission line and said auxiliary transmission line are subject to the same interference, a first amplifying tube having a control electrode thereof coupled to said passive transmission line at said remotely located position, a second amplifying tube having a control electrode thereof coupled to said auxiliary transmission line, said first and second tubes being connected in parallel, a constant current device serially connected with the parallel connected first and second tubes, and an output circuit coupled to said first tube.

3. In a system of the character described, a passive transmission line, an auxiliary transmission line which is substantially the same as said passive transmisson line and of substantially the same length, and which extends generally parallel therewith so as to be subject to substantially the same interference, both said passive and auxiliary transmission lines terminating at a remote point, a first tube, means coupling a control electrode of said first tube to said passive transmission line, a second tube, means coupling a control electrode of said second tube to said auxiliary transmission line, means connecting said first and second tubes in a parallel circuit, and said parallel circuit being serially connected with a constant current device, and an output circuit coupled to said first tube.

4. The arrangement set forth in claim 3 in which said means coupling said auxiliary line to said second tube comprises a cancellation phasing resistance serially connected with said auxiliary line, a cancellation gain resistance shunted by a condenser and serially connected with said cancellation phasing resistance, said cancellation gain resistance having an adjustable tap thereon, and a cancellation balancing resistance serially connected between said tap and said control electrode of said second tube.

5. In an arrangement of the character described, a passive transmission line, an auxiliary transmission line extending generally parallel with said passive line and subject to the same interference as said passive line, each of said transmission lines having an external grounded sheath and an internal conductor shielded by its corresponding sheath, the inner conductor of said passive line being connected to ground through a tapped resistance, the internal conductor of said auxiliary line being connected to ground through a cancellation phasing resistance which is serially connected with a tapped cancellation gain resistance shunted by a condenser, a first amplifying tube having a control electrode thereof coupled to the tap on the first mentioned resistance, a second amplifying tube having a control electrode thereof coupled to said tap on said cancellation gain resistance through a cancellation balancing resistance, both said first and said second tubes connected in parallel and in series with a constant current device, and an output circuit coupled to an output electrode of said first tube.

6. In a system of the character described, a passive transmission line and an auxiliary transmission line extending generally parallel and subject to the same interference, each of said lines having a grounded sheath and a corresponding internal conductor, a first amplifying tube having a control grid, a second amplifying tube having a control grid, a first load resistance serially connected with said first tube, a second load resistance serially connected with said second tube, means interconnecting said first and second tubes and serial load resistances in parallel paths, a constant current device serially connected with the parallel connected first and second tubes, means coupling the control grid of said first tube to the internal conductor of said passive line, means coupling the control grid of said second tube to the internal conductor of said auxiliary line.

7. The arrangement set forth in claim 6 in which the last mentioned coupling means comprises a pair of serially connected resistances between ground and the internal conductor of said auxiliary line, one of said resistances having an adjustable tap thereon and being shunted by a condenser, and a second adjustable resistance connected between said tap and the control grid of said second tube.

8. In a system of the character described, a passive transmission line, an auxiliary transmission line which is substantially the same as said passive transmisson line and of substantially the same length, and which extends generally parallel therewith so as to be subject to substantially the same interference, both said passive and auxiliary transmission lines terminating at a remote point, a first tube, means coupling a control electrode of said first tube to said passive transmission line, a second tube, means coupling a control electrode of said second tube to said auxiliary transmission line, means connecting said first and second tubes in a parallel circuit, a constant current device serially connected with said parallel circuit, an output circuit coupled to said first tube, said means coupling said auxiliary line to said second tube comprising a cancellation phasing resistance serially connected with said auxiliary line, a cancellation gain resistance shunted by a condenser and serially connected with said cancellation phasing resistance, the cancellation gain resistance having an adjustable tap thereon, a cancellation balancing resistance serially connected between said tap and said control electrode of said second tube, and said means coupling said passive line to said first tube comprising a tap resistance serially connected with said passive line, and the tap on said resistance being connected to said control electrode of said first tube.

References Cited in the file of this patent

UNITED STATES PATENTS

| | | |
|---|---|---|
| 1,917,035 | Jacobs | July 4, 1933 |
| 2,201,337 | Franke | May 21, 1940 |